United States Patent
Wainer (10) Patent No.: US 7,164,143 B2
(45) Date of Patent: Jan. 16, 2007

(54) PET AND SPECT SYSTEMS WITH ATTENUATION CORRECTION

(75) Inventor: Naor Wainer, Zichron-Yaakov (IL)

(73) Assignee: Elgems Ltd., Tirat Hacarmel (IL)

( * ) Notice: Subject to any disclaimer, the term of this patent is extended or adjusted under 35 U.S.C. 154(b) by 0 days.

(21) Appl. No.: 10/364,712

(22) Filed: Feb. 11, 2003

(65) Prior Publication Data

US 2003/0147500 A1 Aug. 7, 2003

Related U.S. Application Data

(62) Division of application No. 09/588,402, filed on Jun. 6, 2000, now Pat. No. 6,642,523.

(30) Foreign Application Priority Data

Jun. 6, 1999 (IL) .................................. 130318

(51) Int. Cl.
*G21F 5/02* (2006.01)
(52) U.S. Cl. ...................... 250/497.1; 250/363.04; 378/149; 378/160
(58) Field of Classification Search ............... 378/120, 378/160, 147, 149; 250/496.1, 497.1, 498.1, 250/363.03, 363.04
See application file for complete search history.

(56) References Cited

U.S. PATENT DOCUMENTS

| | | | | |
|---|---|---|---|---|
| 4,277,684 A | * | 7/1981 | Carson | 378/7 |
| 4,433,427 A | * | 2/1984 | Barnea | 378/146 |
| 4,446,570 A | * | 5/1984 | Guth | 378/149 |
| 4,465,540 A | * | 8/1984 | Albert | 156/252 |
| 5,068,883 A | * | 11/1991 | DeHaan et al. | 378/86 |
| 5,338,936 A | * | 8/1994 | Gullberg et al. | 250/363.04 |
| 5,449,913 A | | 9/1995 | Chang | |
| 5,479,021 A | * | 12/1995 | Morgan et al. | 250/363.04 |
| 5,528,659 A | * | 6/1996 | Stein | 378/149 |
| 5,576,545 A | * | 11/1996 | Stoub et al. | 250/363.04 |
| 5,757,886 A | * | 5/1998 | Song | 378/147 |
| 5,900,636 A | | 5/1999 | Nellemann et al. | |
| 5,999,588 A | | 12/1999 | Shao et al. | |
| 6,009,144 A | * | 12/1999 | Ogushi et al. | 378/34 |
| 6,060,712 A | * | 5/2000 | Morgan et al. | 250/363.04 |
| 6,147,353 A | | 11/2000 | Gagnon et al. | |
| 6,201,247 B1 | * | 3/2001 | Lutheran et al. | 250/363.04 |
| 6,211,523 B1 | | 4/2001 | Gagnon | |
| 6,271,524 B1 | | 8/2001 | Wainer et al. | |
| 6,281,505 B1 | | 8/2001 | Hines et al. | |
| 6,384,416 B1 | | 5/2002 | Turkington et al. | |
| 6,388,244 B1 | | 5/2002 | Gagnon | |
| 6,429,434 B1 | * | 8/2002 | Watson et al. | 250/363.04 |

FOREIGN PATENT DOCUMENTS

| | | |
|---|---|---|
| JP | 57-211569 | 12/1982 |
| WO | WO 98/23974 | 6/1998 |
| WO | WO 98/47103 | 10/1998 |
| WO | WO 00/17670 | 3/2000 |

* cited by examiner

*Primary Examiner*—Edward J. Glick
*Assistant Examiner*—Thomas R. Artman
(74) *Attorney, Agent, or Firm*—Fenster & Company (57) ABSTRACT

A radiation source comprising:
  a source of radiation;
  a plate having an aperture formed therein, said aperture facing the source of radiation; and
  means for moving the source when no radiation is desired on the side of the plate away from the source.

14 Claims, 6 Drawing Sheets

PET AND SPECT SYSTEMS WITH ATTENUATION CORRECTION

RELATED APPLICATIONS

The present application is a divisional of U.S. application Ser. No. 09/588,402, filed on Jun. 6, 2000 now U.S. Pat. No. 6,642,523.

FIELD OF THE INVENTION

The present invention relates generally to the field of medical imaging by PET and by SPECT systems. The present invention relates in particular to PET and SPECT systems with simultaneous, single-photon transmission imaging for attenuation corrections.

BACKGROUND OF THE INVENTION

Single photon emission computerized tomography (SPECT) and positron emission tomography (PET) are well known nuclear imaging systems in medicine. Generally, in nuclear imaging, a radioactive isotope is injected to, inhaled by or ingested by a patient. The isotope, provided as a radioactive-labeled pharmaceutical (radio-pharmaceutical) is chosen based on bio-kinetic properties that cause preferential uptake by different tissues. The gamma photons emitted by the radio-pharmaceutical are detected by radiation detectors outside the body, giving its spatial and uptake distribution within the body, with little trauma to the patient.

SPECT imaging is based on the detection of individual gamma rays emitted from the body, while PET imaging is based on the detection of gamma-ray pairs that are emitted in coincidence, in opposite directions, due to electron-positron annihilations. In both cases, data from the emitted photons is used to produce spatial images of the "place of birth" of a detected photon and a measure of its energy. In PET, photon detectors also provide an indication of the time when a photon is detected.

An Anger gamma camera generally comprises a scintillation crystal, which when struck by a photon emits light, an array of photomultiplier tubes (PMTs) arranged in a conventional hexagonal matrix, for giving the x-y position of the detected photon, various processing circuitry, and a processing unit. Solid state gamma cameras generally include an array of pixel sized detectors and may be based on one of a number of different technologies. Solid state cameras suitable for use in SPECT and/or PET imaging are described in PCT Application No. PCT/IL98/00462 filed Sep. 24, 1998, now WO publication 00/17670 and PCT publication WO 98/23974, the disclosures of which are incorporated herein by reference.

Many SPECT and PET systems utilize one or two gamma cameras of either the Anger or solid state type to detect gamma rays.

SPECT and PET imaging couple conventional planar nuclear imaging techniques and tomographic reconstruction methods. Gamma cameras, arranged in a specific geometric configuration, are mounted on a gantry that rotates them around a patient, to acquire data from different angular views. Projection (or planar) data acquired from different views are reconstructed, using image reconstruction methods, to generate cross-sectional images of the internally distributed radio-pharmaceuticals. These images provide enhanced contrast and greater detail, when compared with planer images obtained with conventional nuclear imaging methods.

In general, it is desirous to have imaging systems that can be used both for PET and for SPECT, depending on the need.

A factor that influences the quality of imaging is non-uniform photon attenuation by intervening tissue, that is tissue through the which the gamma rays must pass before being detected by the gamma camera or cameras. Transmission scanning is a technique used to generate an attenuation map for correcting gamma images for non-uniform attenuation. In principle, gamma radiation from a known source, external to the tissue, is transmitted through the tissue to a corresponding scintillation detector. As in the cases of SPECT and PET, the external radiation source and the detector are rotated around the tissue, and transmission data from different angular views, coupled with tomographic reconstruction methods are used generate an attenuation map of the internal structure.

Two important points in generating an attenuation map are that transmission scanning must be performed for each patient individually, as patients differ in size and in internal structure and that transmission scanning should be performed on the same spatial registry as the PET or SPECT imaging, else it is difficult to correlate between the attenuation map and the PET or SPECT data.

Therefore, transmission scanning is generally performed simultaneously or concurrently with the PET or SPECT imaging, using the same detector system for the PET or SPECT imaging and for the transmission scanning. In many systems, use photons of different energies to differentiate between the transmission scanning photons and those of PET or SPECT imaging.

Figure 1:
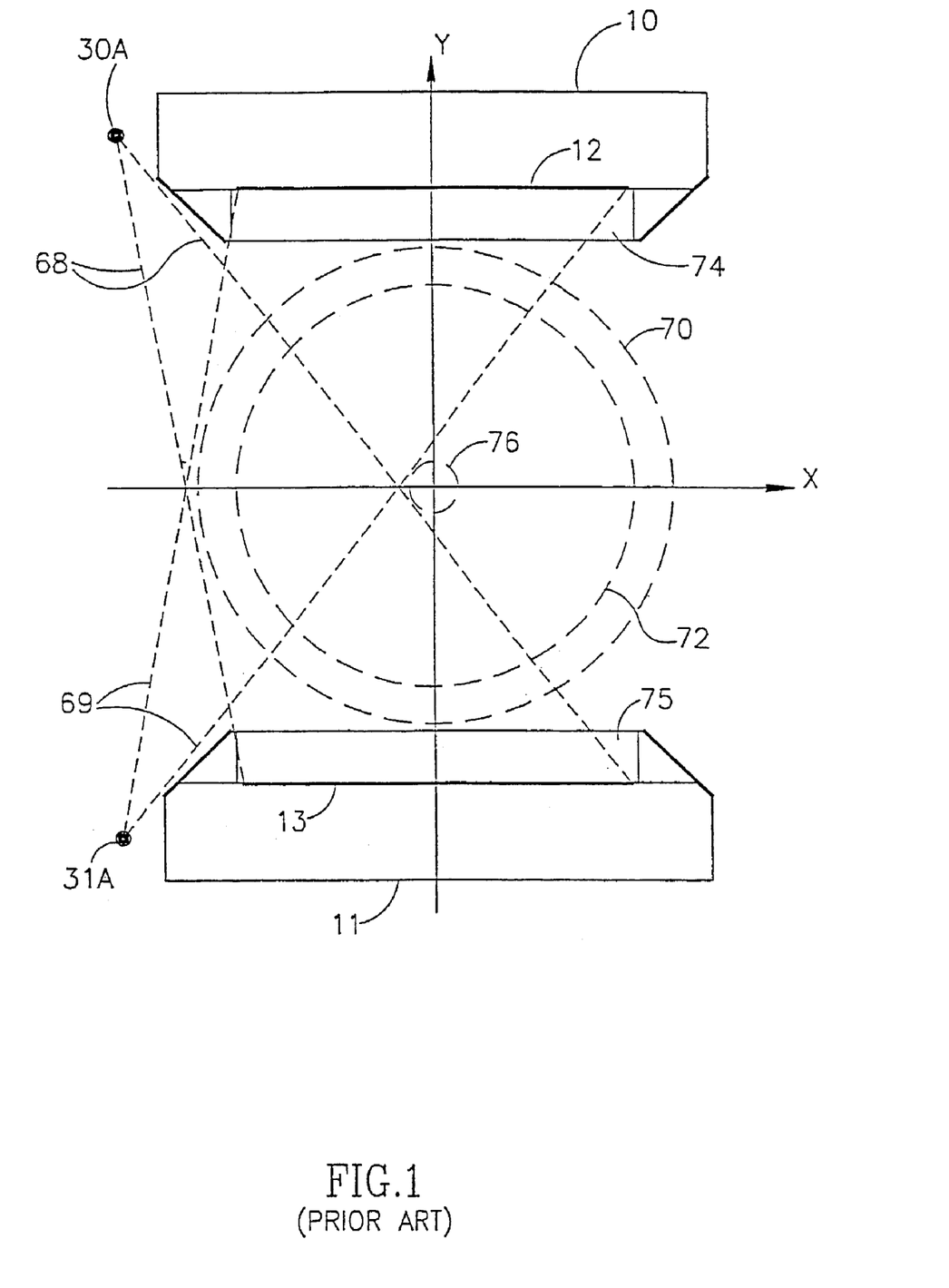
FIG. 1 is a schematic illustration of a gamma camera system utilizing single-photon transmission scanning for attenuation correction of PET data, as known in the art.

U.S. Pat. No. 5,900,636 to Nellemann, "Dual-Mode Gamma Camera system Utilizing Single-Photon Transmission Scanning for Attenuation Correction of PET Data," whose disclosure is incorporated herein by reference, describes a system of simultaneous PET of SPECT imaging and transmission scanning. FIG. 1 illustrates a view in a transverse (x-y) plane, in which two transmission point sources 30A and 31A are on the same side as two gamma detectors 10 and 11 in the transaxial (x) direction. Point sources 30A and 31A are mounted outside the fields of views (FOVs.) of detectors 10 and 11. Such mounting avoids blocking the detectors and reduces transmission self-contamination (where radiation from a point source strikes the detector near it). A transmission scan across the entire axial width of detectors 10 and 11 is performed at each angular stop about the z axis. The aggregate effect of these transmission scans with the illustrated placement of point sources 30A and 31A is a transmission FOV (of each transverse slice) represented by a circle 70. The emission field of view (in each transverse slice) is represented by circle 72.

In this device, the allowable width (in the transverse plane) of the fan beam generated by point sources 30A and 31A is limited by detectors 10 and 11. Thus, the transmission FOV 70 is defined by two boundaries, an outside boundary and an inside boundary. The outside boundary is defined by the outer edges of the transmission fan beams 68 and 69 at each of the angular stops about the z axis, while the inside boundary is defined by the circumference of a circle 76, which represents a blind spot in the attenuation map. In order to prevent the gap from resulting in incomplete data acquisition, the computer system (not shown) causes the examination table (not shown) to move vertically and horizontally relative to the z axis in dependence on the angular positions of the detectors 10 and 11 about the z axis, in order to provide full coverage of the object of interest.

SUMMARY OF THE INVENTION

An aspect of some preferred embodiments of the present invention relates to providing a PET or SPECT system with simultaneous, single-photon transmission scanning yielding complete coverage of all the tissue that is being examined, so that a complete tissue attenuation map is obtained, with no blind spots.

An aspect of some preferred embodiments of the present invention relates to providing a PET or SPECT system with simultaneous or sequential, single-photon transmission scanning wherein transmission scans can be obtained in one pass, rather than in a series of axial stops along the z axis.

An aspect of some preferred embodiments of the present invention relates to providing a PET system with simultaneous or sequential, single-photon transmission scanning wherein the transmission scanning can be shut off at will.

In one preferred embodiment of the invention, two gamma detectors are positioned facing each other, with a fan beam transmission source at the edge of one detector. The tissue to be examined is placed between them and the system is rotated about an axis. The axis is shifted towards the side of the line source. The tissue is completely within a rectangle bounded by the two detectors and the axis of rotation, is within the field of view of the fan beam line source. The source may be outside or inside the rectangle formed by (or the largest rectangle defined by) the gamma detectors.

In other preferred embodiments of the invention, two gamma cameras having slightly different transverse extents are utilized. One edge of the two detectors is so aligned with the other detector such that the other edge of the wider detector extends past a rectangle formed by the other three edges. A transmission source is placed at the edge of detector diagonally across from the extending edge. The extending edge is made to extend far enough such that the center of rotation of the two detectors is within a fan beam of radiation from the transmission source that is detected by the wider detector. The source may be outside or inside the rectangle formed by (or the largest rectangle defined by) the gamma detectors.

In other preferred embodiments of the invention, both effects are utilized and one detector extends past the other and the center of rotation is slightly displaced such that the center of rotation is within the fan beam.

An aspect of some preferred embodiments of the present invention relates to providing a transmission line source comprising multiple fan-beams so that scanning of many slices along the z direction can be obtained simultaneously. In preferred embodiments of this aspect, a radio-opaque rod, such as a tungsten rod, is used. Blind holes are drilled along the rod at equal distances, and a radioactive material of the desired properties is inserted into each hole. As such, the rod provides a linear array of point sources.

In a preferred embodiment of the invention, a radio-opaque plate is formed with slits spaced the same distance apart as the holes in the rod (and the sources) and having their long direction perpendicular to the axis of the rod. The slits are aligned with the sources such that a series of fan beams are formed. The plate which is thick enough to substantially limit the width of a beam such that the beams are limited in extent in the direction of the rod.

An aspect of some preferred embodiments of the present invention relates to providing a transmission source assembly wherein the transmission source can be shut off and turned on at will.

In some preferred embodiments of this aspect, a metal rod into which point sources have been inserted, as described above, is used. The metal rod is positioned on a sliding mechanism in a shielded box (for example a lead box or a tungsten box), with the edge of the rod, free of point sources, protruding from the side of the box. The top of the box is formed with open slits, as described above. When it is desired to shut off the point sources, the edge of the rod is pulled, so as to sufficiently misalign the point sources with the slits at the top of the box and to block radiation from exiting from the slits.

Alternatively, but less desirably, the rod itself is fixed, but the slits at the top of the box may be shut by putting a shielded cover on them.

There is thus provided, in accordance with a preferred embodiment of the invention, a nuclear imaging system comprising:

first and second radiation detectors, each comprising an imaging surface facing each other and each having an extent;

an radiation source, situated outside a space defined by a largest parallelepiped formed on two sides by said first and second detectors, which irradiates the second detector; and an axis about which the first and second detectors and the radiation source rotate together;

wherein the field of view of the radiation source, defined by lines connecting the external source and the edges of the second detector, encompass the axis of rotation.

In a preferred embodiment of the invention, the first and second radiation detector have different transverse extents, one edge of the two detectors is aligned with each other such that the other edge of the wider detector extends past the parallelepiped and wherein the radiation source is placed near the edge of the short detector diagonally across from the extending edge.

In a preferred embodiment of the invention, the first and second radiation detector have different transverse extents, both edges of a short detector being outside said parallelepiped, wherein the radiation source is placed near an edge of the short detector and diagonally opposed edge of the wider detector extends past the parallelepiped by an amount sufficient such that the axis of rotation is within the field of view.

Preferably, the radiation source comprises a line of sources extending along the edge of the shorter detector.

Preferably, the irradiation source comprises a plurality of point sources collimated to produce fan beams each defining a plane perpendicular to the axis of rotation.

Preferably, the extending edge is made to extend far enough such that the center of rotation of the two detectors is within a fan beam of radiation from the transmission source that is detected by the wider detector.

Preferably, the axis of rotation is substantially at the center of the parallelepiped or of a rectangle defined by edges of the shorter detector and the edge of the longer detector aligned with the edge of the shorter detector.

Alternatively or additionally, the axis of rotation is displaced such that the center of rotation is within the field of view of the line source. Preferably,the axis of rotation is displaced in the direction of the aligned edges, from the center of a rectangle defined by edges of the shorter detector and the edge of the longer detector aligned with the edge of the shorter detector. Alternatively or additionally, the axis of rotation is displaced in the direction of the detector farther from the source.

In a preferred embodiment of the invention, the first and second detectors have substantially the same extent and are aligned with each other at one side of the parallelepiped and wherein the axis of rotation is displaced from the center of the parallelepiped.

In a preferred embodiment of the invention, the first and second detectors have different extents and wherein the edges of the detectors are aligned with each other on one side of the parallelepiped, the source is placed near the opposite edge of the smaller detector and the axis of rotation is displaced from the center of the parallelepiped.

Preferably, the axis of rotation is displaced toward the open side of the parallelepiped at which the radiation source is situated. Alternatively, the axis of rotation is displaced in the direction of detector farther from the source.

Preferably, the radiation source comprises a line of sources extending along the edge of the shorter detector. Preferably, the irradiation source comprises a plurality of point sources collimated to produce fan beams each defining a plane perpendicular to the axis of rotation.

There is further provided, in accordance with a preferred embodiment of the invention, a nuclear imaging system comprising:

first and second radiation detectors, each comprising an imaging surface facing each other and each having an extent;

an radiation source, situated inside a space defined by a largest parallelepiped formed on two sides by said first and second detectors, which irradiates the second detector; and an axis about which the first and second detectors and the radiation source rotate together;

wherein the field of view of the radiation source, defined by lines connecting the external source and the edges of the second detector, encompass the axis of rotation and wherein the field of view of the radiation source does not encompass the center of the parallelepiped.

In a preferred embodiment of the invention, the first and second radiation detector have different transverse extents, one edge of the two detectors is aligned with each other such that the other edge of the wider detector extends past the parallelepiped and wherein the radiation source is placed near the edge of the short detector diagonally across from the extending edge. Preferably, the radiation source comprises a line of sources extending along the edge of the shorter detector. Preferably, the irradiation source comprises a plurality of point sources collimated to produce fan beams each defining a plane perpendicular to the axis of rotation. Preferably, the extending edge is made to extend far enough such that the center of rotation of the two detectors is within a fan beam of radiation from the transmission source that is detected by the wider detector.

In a preferred embodiment of the invention, the axis of rotation is substantially at the center of the parallelepiped. Alternatively, the axis of rotation is displaced from the center of the parallelepiped, such that the center of rotation is within the field of view of the line source. Preferably, the axis of rotation is displaced in the direction of the aligned edges. Alternatively or additionally, the axis of rotation is displaced in the direction of the detector farther from the source.

In a preferred embodiment of the invention, the first and second detectors have substantially the same extent and are aligned with each other at one side of the parallelepiped and wherein the axis of rotation is displaced from the center of the parallelepiped. Preferably, the axis of rotation is displaced toward the open side of the parallelepiped at which the radiation source is situated. Alternatively or additionally, the axis of rotation is displaced in the direction of detector farther from the source.

Preferably, the radiation source comprises a line of sources extending along the edge of the shorter detector. Preferably, the irradiation source comprises a plurality of point sources collimated to produce fan beams each defining a plane perpendicular to the axis of rotation.

There is further provided, in accordance with a preferred embodiment of the invention a radiation source comprising:

a source of radiation;

a plate having an aperture formed therein, said aperture facing the source of radiation; and means for moving the source when no radiation is desired on the side of the plate away from the source.

In a preferred embodiment of the invention, the plate is a flat plate.

Preferably, the plate has a thickness that is greater than the smallest dimension of the aperture. Preferably, the thickness is more than five or ten as large as the smallest dimension of the aperture.

Preferably, the aperture has a slit shape, such that the radiation exiting the slit forms a collimated fan beam.

There is further provided, in accordance with a preferred embodiment of the invention, a radiation source comprising:

a plurality of individual sources of radiation;

a plate having an apertures formed therein, each said aperture facing a respective individual source of radiation; and means for moving the sources such that they do not face the apertures when no radiation is desired on the side of the plate away from the source.

Preferably, the plate is a flat plate.

Preferably, the means for moving displaces the sources so that they are situated between the apertures when no radiation is desired. Alternatively or additionally, the means for moving rotates the sources so that they do not face in the direction of the plate.

Preferably, the plate has a thickness that is greater than the smallest dimension of the aperture. Preferably, the thickness is more than five or ten as large as the smallest dimension of the aperture.

Preferably, the aperture has a slit shape, such that the radiation exiting the slit forms a collimated fan beam.

There is further provided, in accordance with a preferred embodiment of the invention, a radiation source comprising:

a plurality of individual sources of radiation; and a plate having an apertures formed therein, each said aperture facing a respective individual source of radiation, wherein the plate has a thickness that is greater than the smallest dimension of the aperture.

Preferably, the plate is a flat plate.

Preferably, the means for moving displaces the sources so that they are situated between the apertures when no radiation is desired. Alternatively or additionally, the means for moving rotates the sources so that they do not face in the direction of the plate. Preferably, the plate has a thickness that is greater than the smallest dimension of the aperture. Preferably, the thickness is more than five or ten as large as the smallest dimension of the aperture.

Preferably, the aperture has a slit shape, such that the radiation exiting the slit forms a collimated fan beam.

BRIEF DESCRIPTION OF THE DRAWINGS

The present invention will be more clearly understood from the following detailed description of the preferred embodiments of the invention and from the attached drawings, in which same number designations are maintained throughout the figures for each element and in which.

DETAILED DESCRIPTION OF PREFERRED EMBODIMENTS

Figure 2A:
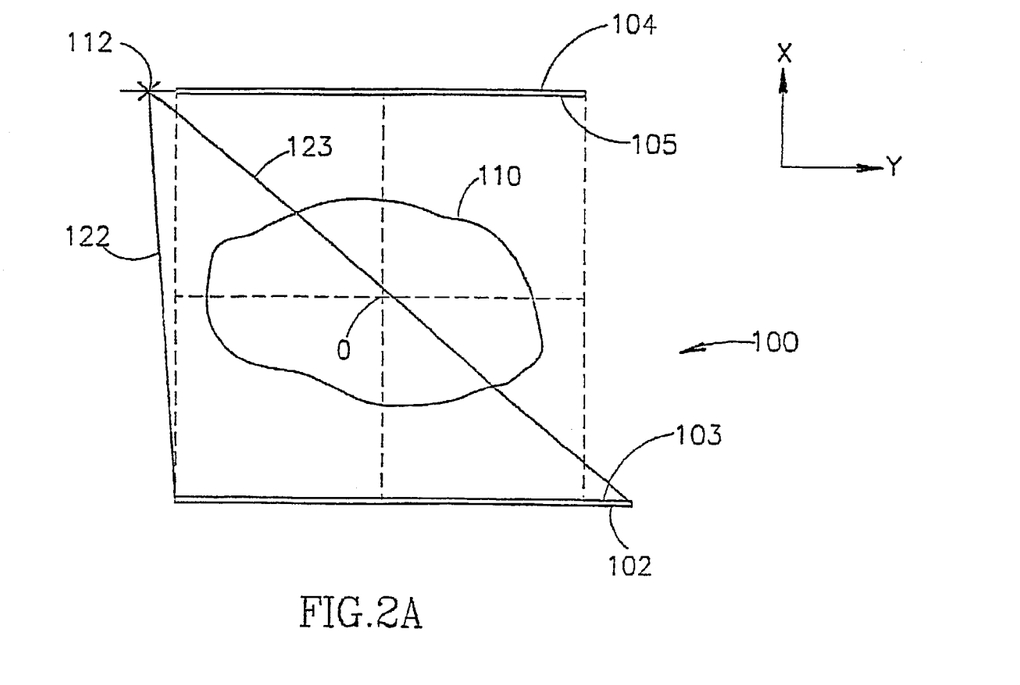
FIGS. 2A–2F are schematic illustrations of PET systems with simultaneous, single-photon transmission scanning for attenuation corrections, in accordance with preferred embodiments of the present invention.

Reference is now made to FIG. 2A which is a schematic illustration of a PET system 100 with simultaneous or sequential, single-photon transmission scanning for attenuation corrections, in accordance with a preferred embodiment of the present invention. PET system 100 comprises two scintillation detectors 102 and 104, having imaging surfaces 103 and 105 respectively. Detectors 102 and 104 are disposed opposite each other and are mounted on a gantry (not shown). The gantry rotates detectors 102 and 104 around the z axis, at point 0, perpendicular to the x-y plane. A patient, having a two dimensional projection 110 on the x-y plane is situated between detectors 102 and 104.

A line-source assembly 112 is located near detector 102, slightly shifted from detector 102 along the x axis and preferably (but not necessarily), flush with imaging surface 103. The field of view of line source 112 in the x-y plane is described by lines 122 and 123, connecting line source 112 and the edges of receiving detector 102. In order for there to be no blind spot in the attenuation map, the field of view of line source 112 must encompass the center of rotation. This situation is achieved by the asymmetry of the setup, in that detector 104, the receiving detector for the transmission data, extends to the side of detector 102 opposite line source 112. Note that the amount of asymmetry and the distance of the source from the edge are exaggerated in FIGS. 2A and 2B. In a practical system in which the detectors have an extent of 54 cm, the source is 3 cm from the edge and the edge is extended by 3 cm or more. In addition, the source may be placed above the plane of detector, for example by 3–5 cm. In this case however, the lower detector must be extended by a greater amount. However, it should be understood that the distances and dimensions are based on the geometry of the system, as described above.

By comparison, in FIG. 1 (from U.S. Pat. No. 5,900,636), a symmetric situation is described. The field of view of source 30A is defined by lines 68 where internal line 68 is less acute than a line connecting the source with the center of the origin of the x-y plane, and a blind spot, bounded by circle 76, is generated.

Figure 2B:
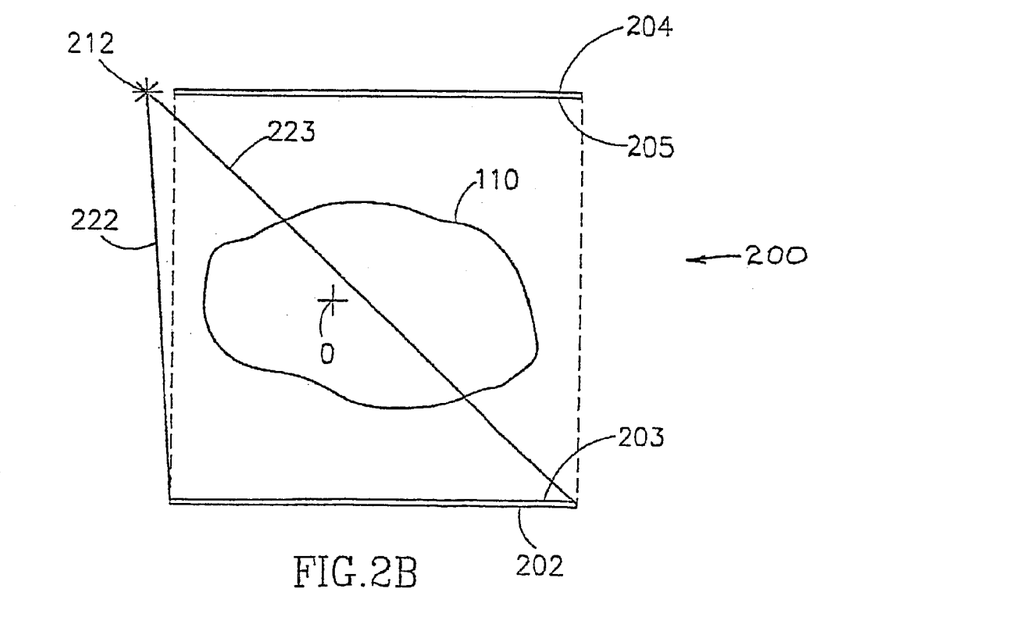

Reference is now made to FIG. 2B which is a schematic illustration of an alternative SPECT or PET system 200 with simultaneous or sequential, single-photon transmission scanning for attenuation corrections, in accordance with another preferred embodiment of the present invention. In FIGS. 2A–2F, the numbers n00, n02–n05, n12, n22 and n23 refer to the same features, where n=1 for FIG. 2A, n=2 for FIG. 2B, n=3 for FIG. 2C, n=4 for FIG. 2D, n=5 for FIG. 2E and n=6 for FIG. 2E. In system 200, two scintillation detectors 202 and 204, of equal dimensions, having imaging surfaces 203 and 205 respectively, are used. Detectors 202 and 204 are rotated about a center O, which is shifted from the center of the rectangle formed by detectors 202 and 204 by an amount large enough so that the center of rotation is within the field of view (222, 223) of a source 212.

In a practical system in which the detectors have an extent of 54 cm, the source is 3 cm from the edge of and the center is offset by 2 cm or more. In addition, the source may be displaced toward the plane of the other detector, for example by 3–5 cm. In this case however, the lower detector must be extended by a greater amount. However, it should be understood that the distances and dimensions are based on the geometry of the system, as described above.

Figure 2C:
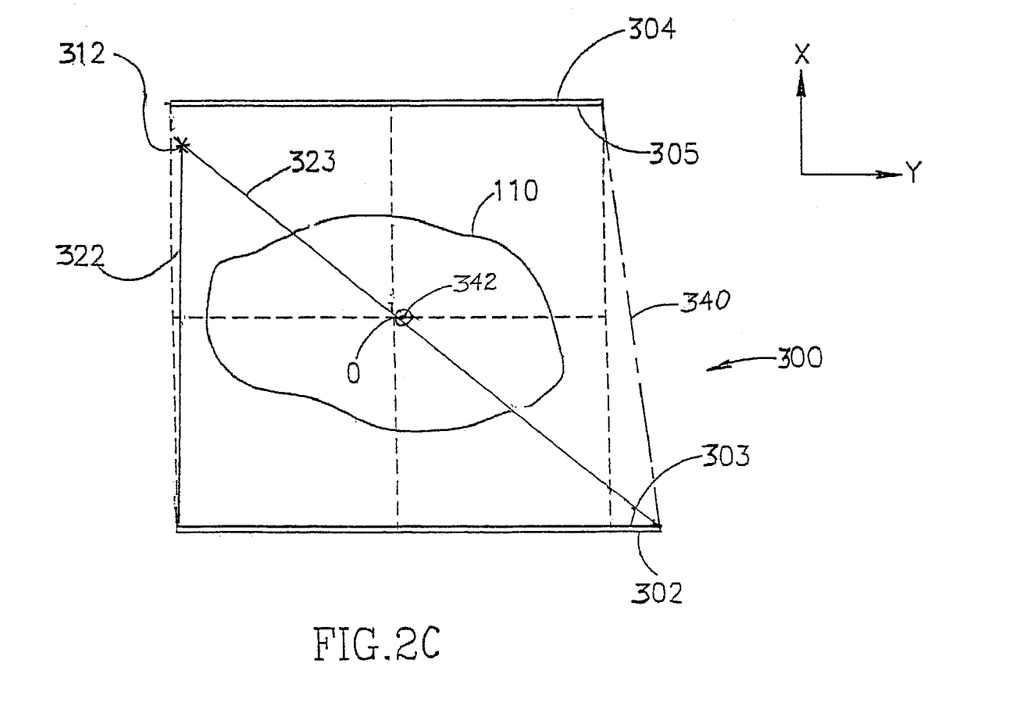

FIG. 2C shows a system 300 in which source 312 is within the boundaries of the rectangle formed by the detectors. Here again, without any changes in the normal center of rotation or the size of the opposing detector, the center of rotation would be outside the fan beam 322, 323. An extension to detector 302 solves the problem. The extent of the parallelepiped formed by the two detectors is indicated by lines 340 and 322 and the center of the parallelepiped is indicated by dot 342 (surrounded by a circle for ease of indication).

Figure 2D:
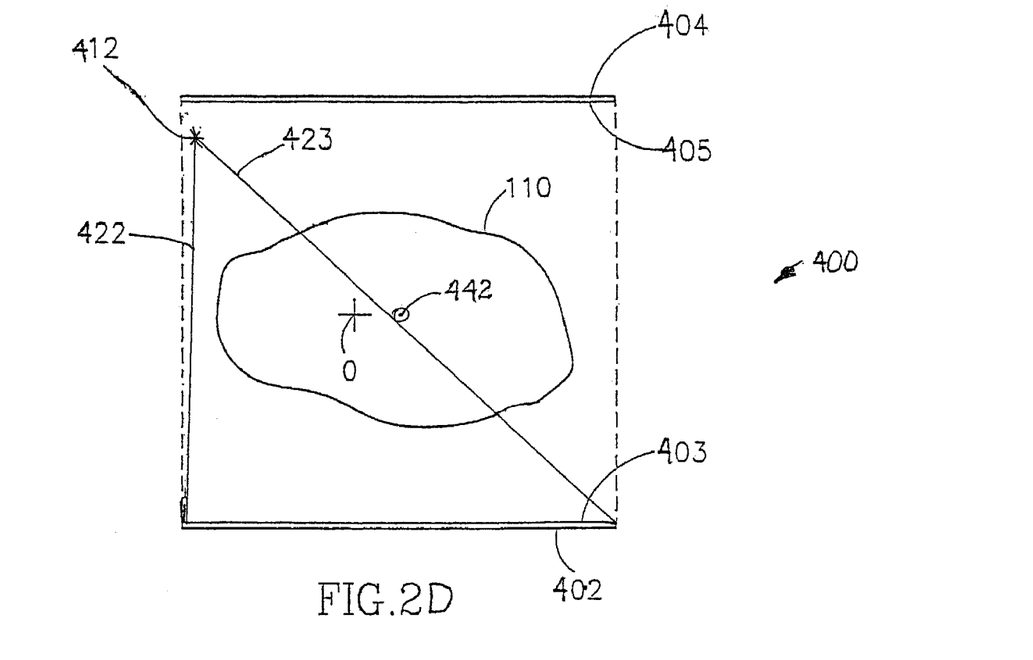

FIG. 2D shows a system 400 in which the position of the source is similar to that of FIG. 3C. However, the solution of the problem is to offset the center of rotation as in FIG. 2B. The center of the parallelepiped (rectangle) is indicated by dot 442 (surrounded by a circle for ease of indication).

Figure 2E:
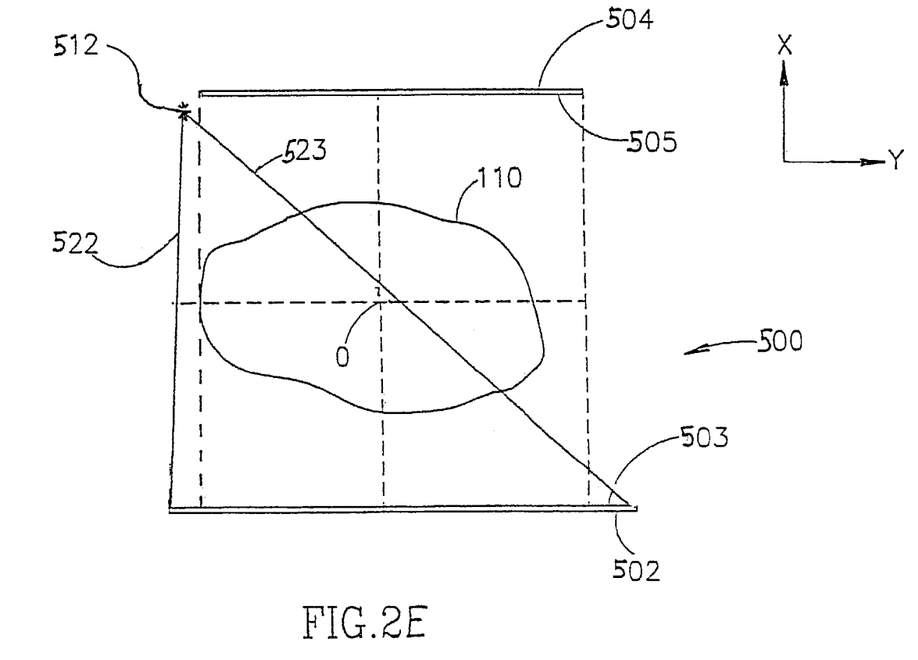
Figure 2F:
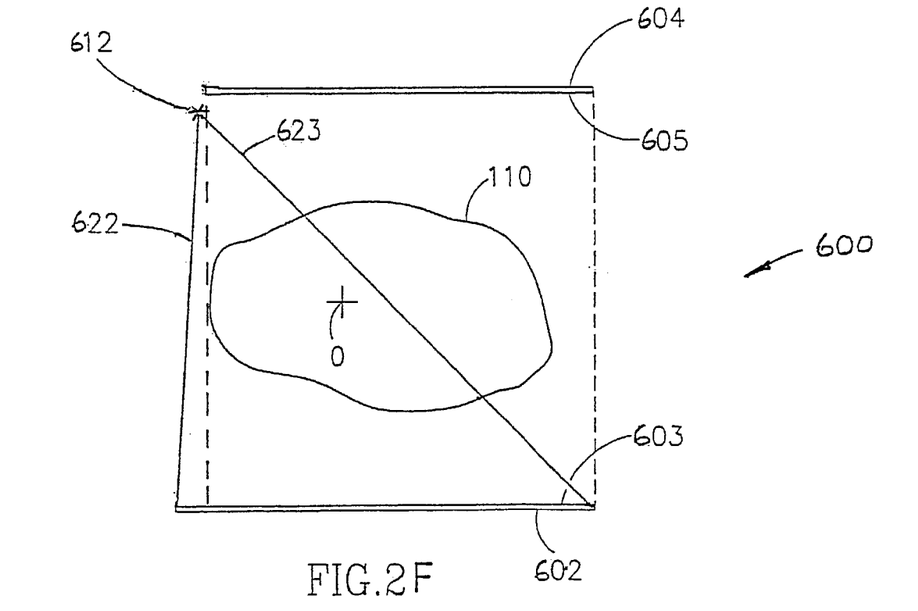

FIGS. 2E and 2F show embodiments of the invention in which the portion of the detector behind the source is removed. This may be possible (although not necessarily desirable) if the source is placed in a housing that blocks the portion of the detector behind the source.

While the center of rotation in FIGS. 2B, 2D and 2F is shown as being offset to the left of the center of the rectangle formed by the detectors, it is also possible to achieve the same effect by moving the center of rotation downward.

In the embodiments of FIGS. 2A–2F, projections through the patient, as the system rotates, cover all parts of the patient cross-section 110, such that data for an attenuation map of the patient, with no blind spots can be acquired. Additionally or alternatively, if a blind spot does occur, it is possible to interpolate the values from the edge of the blind spot to "fill" the hole with continuous attenuation information.

While FIGS. 2A–2F show either extension of one of the detectors or movement of the center of rotation, it should be understood that a combination of a smaller extension and a smaller offset may be utilized to overcome the problem of dead space in the center.

Figure 3A:
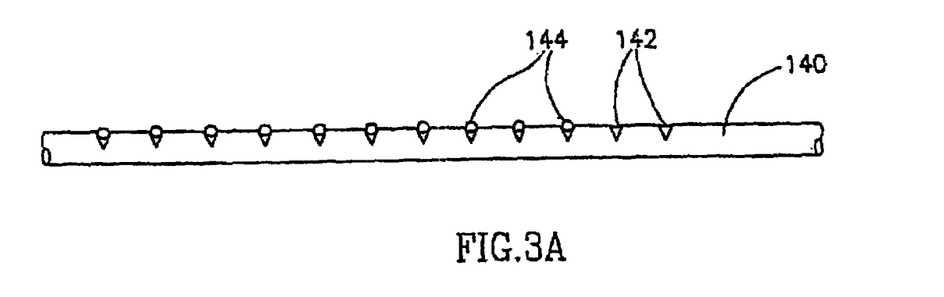
FIGS. 3A–3C are schematic illustrations of the fan beam transmission source rod and source assembly, in accordance with preferred embodiments of the present invention.

Reference is now made to FIG. 3A which is a schematic illustration of line source rod 140 in accordance with a preferred embodiment of the present invention. The purpose of the line source is to provide multiple fan-beams so that scanning of many slices along the z direction can be obtained at one time. FIG. 3A illustrates a radio-opaque (e.g., tungsten) rod into which blind holes 142 are drilled at equal distances. While conical holes are shown, round holes or holes with other shapes may be used. Radioactive material 144 of the desired properties is inserted into each hole 142. In some preferred embodiments of the invention, glue is used to keep radioactive material 144 in place. Alternatively, the radioactive material 144 is in itself a metal which can be fused in each hole 142. Alternatively, the radioactive material 144 is molten and poured into each hole 142 where it hardens into a solid. Alternatively, the radioactive material is embedded in a ceramic matrix or embedded in an epoxy material. Conveniently, the radiation source is Cs 137, having a 662 keV peak.

Preferably, the length of rod 140 (which serves as line sources 112 and 212 in FIGS. 2A and 2B) in the z direction is substantially the same as the length of detectors 102, 104, 202 and 204 in the z direction.

Figure 3B:
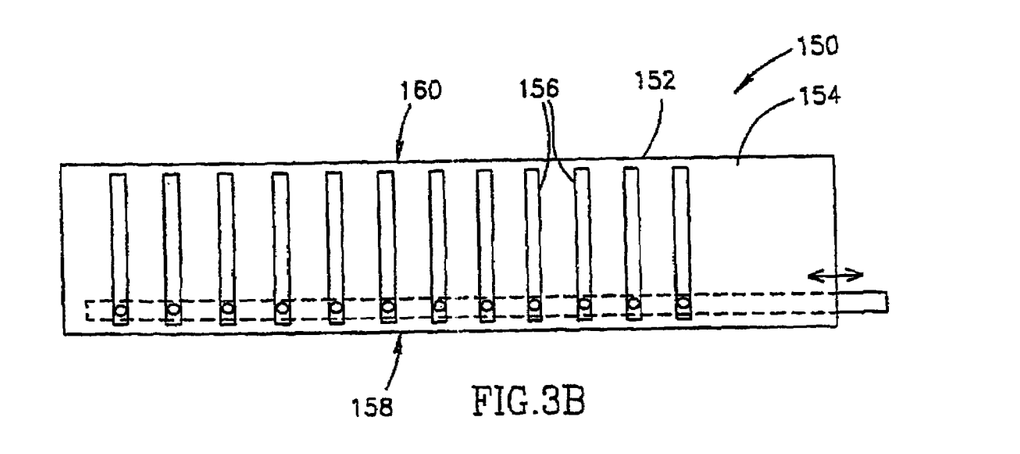
Figure 3C:
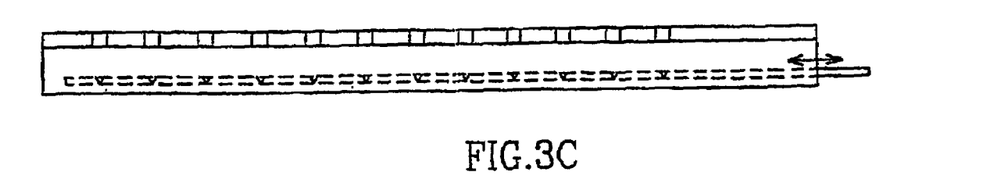

Reference is now made to FIGS. 3B and 3C which schematically illustrate the line-source assembly 150 from top and side views respectively, in accordance with a preferred embodiment of the present invention. Line source assembly 150 comprises a shielded box 152 such as a lead or a tungsten box. Preferably, the length of box 152 is substantially the same as the length of detectors 102, 104, 202 or 204 in the z direction. Preferably, the width of box 152 is given by a parameter W that will be described shortly.

Preferably, box 152 has a shielded top 154, preferably of the same material as box 152. top 152 is shown as a flat plate, however, rounded plates can also be used. Preferably slots 156 are formed in top 154, spaced at the same distances as are sources 144. In a preferred embodiment of the invention, the distance between the slot centers (and the sources is 21 mm. In a preferred embodiment of the invention, the width of each slot 156 is 2.4 mm and the thickness of the top is 30 mm.

Preferably, rod 140 containing multiple point sources 144 is inserted into box 152, preferably, close to top 154. Preferably, rod 140 is inserted along a track (not shown) so that it can slide easily in and out. Preferably, rod 140 is positioned so that each source 144 is directly aligned with a slot 156. Since the radiation being emitted from each slot 156 has a fan-beam shape, assembly 150 is basically a line source of multiple, fan beam sources.

A feature of assembly 150 is that the radiation can be shut off, by sliding rod 140 so that point sources 144 are no longer aligned with slots 156. The slots, which are deep and thin, block the radiation. Alternatively or additionally, the rod may be rotated so that the radio-active material faces away from the slots. Alternatively or additionally, slots 156 may be covered with a shielding material.

Preferably, the length of the slots, W is such that the field of view of the radiation passing the slot is the same as that formed by the geometry of the source and detectors, namely the field of view defined in FIG. 2A by lines 122 and 123, and in FIG. 2B by lines 222 and 223.

Each of detectors n02, n04 includes a scintillation crystal, an array of photomultiplier tubes (PMTs) arranged in a conventional matrix, various processing circuitry, and a processing unit. Gamma camera detectors such as detectors n02, n04 are well known; accordingly, a detailed description of the internal components of the detectors is not necessary to an understanding of the present invention. Detectors n02, n04 may be any gamma detectors or gamma cameras as known in the art, such as solid state detectors.

In some preferred embodiments the gantry can rotate detectors n02 and n04 individually or in unison, about axis of rotation z. The 180°-detector configuration, shown in FIGS. 2A–2F, is intended to facilitate coincidence (PET) imaging. For PET imaging a coincidence detector as known in the art is used to determine coincidence of events detected by the opposing detectors.

In some preferred embodiments systems n00 may be used as SPECT systems or as PET systems or as both SPECT and PET systems.

For some systems, for example for PET, a collimator is not required. In general, for such systems, if lower energy gamma rays are used for the transmission imaging, a low energy collimator having septa along width of the beam can be used on detectors m02. Alternatively, if septa are used in the PET system (as described for example in U.S. application Ser. No. 09/129,078, filed Aug. 5, 1998 and entitled "Gamma Ray Collimator", now U.S. Pat No. 6,271,524, the disclosure of which is incorporated herein by reference) then a higher energy gamma ray is used for the transmission radiation source, such that the septa are substantially transparent to the transmission radiation.

For SPECT systems for which a collimator is generally provided, a high energy transmission source is used, for which the collimator is substantially transparent.

It should be understood, that due to the high collimation of the transmission sources and their spacing, collimation for the transmission receiver can be omitted.

Figure 4:
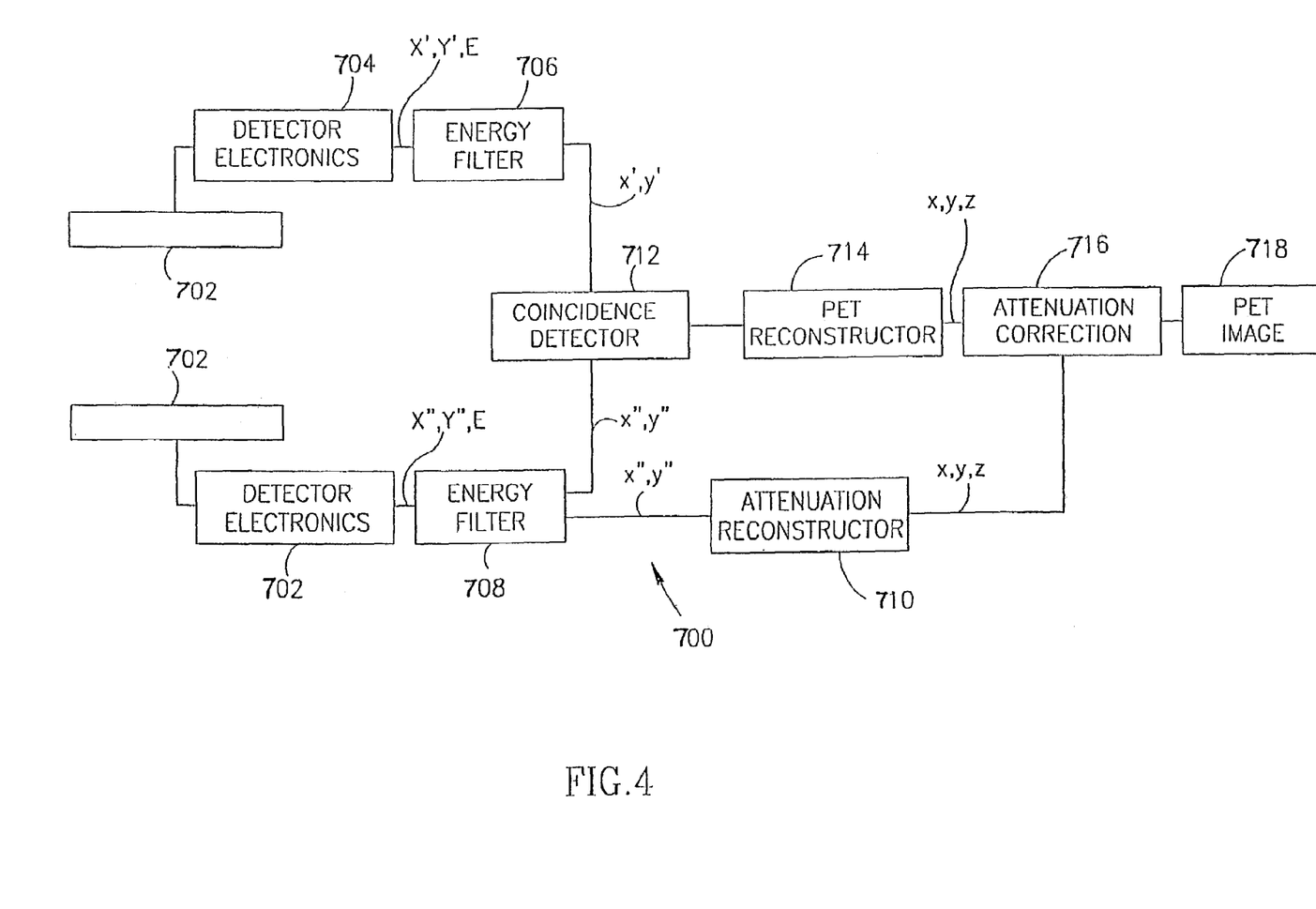
FIG. 4 is a schematic diagram of a PET system with attenuation correction.

FIG. 4 shows a functional diagram of a PET system 700 in accordance with a preferred embodiment of the invention. System 700, includes detectors n02 and n04 and associated detector electronics 702 and 704, which produce position and energy signals x', y', E and x", y" and E for the positions and energy of the events detected on the detectors. Associated with detector n04 is an energy filter 706 which passes only events having the correct energy associated with the PET image. An energy filter 708, associated with detector n02 passes events associated with the attenuation measurement (transmission radiation), to an attenuation reconstructor 710 which constructs an attenuation map, utilizing methods known in the art. Reconstructor 710 transforms the attenuation map at the transmission energy to attenuation values at the emission energy.

Energy filter 708 passes events having energy associated with the PET image to a coincidence detector 710 which also receives events from filter 706 having this same energy. Coincident events are passed to a PET reconstructor 714, which operates according to any of the algorithms known in the art, for example that shown in PCT application No. PCT/IL97/00128, filed on Apr. 17, 1997, now WO publication WO 98/47103, the disclosure of which is incorporated herein by reference. The PET image is corrected either after or during its reconstruction, based on the attenuation map generated by attenuation reconstructor 710. The attenuation correction is shown as being performed in a corrector 716, to produce a corrected PET image 718.

It should be understood that FIG. 4 is a functional representation of the PET system and does not necessarily represent particular hardware, which may be any suitable hardware as known in the art. Furthermore, some or all of the data processing indicated in FIG. 4 may be performed by dedicated hardware or by software in a computer or by a combination of the two. Furthermore, while certain steps are shown in a particular order (for example, energy filtering before coincidence detection and attenuation correction after PET reconstruction) the steps can be performed in reverse order or as part of a single procedure.

The present invention has been described using non-limiting detailed descriptions of preferred embodiments thereof that are provided by way of example and are not intended to limit the scope of the invention. Variations of embodiments described will occur to persons of the art. The disclosed embodiments each have a plurality of feature, some of which may be added to other embodiments and some of which may be omitted. Furthermore, the terms "comprise," "include," and "have" or their conjugates, mean, when used in the claims, "including but not necessarily limited to." The scope of the invention is limited only by the following claims.

The invention claimed is:

1. A radiation source comprising:

a source of radiation distributed along a given direction;

a plate having an aperture formed therein, said aperture facing the source of radiation; and means for moving the source along the given direction when no radiation is desired on the side of the plate away from the source.

2. A radiation source according to claim 1 wherein the plate is a flat plate.

3. A radiation source according to claim 1 wherein the plate has a thickness that is greater than the smallest dimension of the aperture.

4. A radiation source according to claim 3 wherein the thickness is more than five times as large as the smallest dimension of the aperture, such that radiation exiting the aperture is collimated in the direction of the smallest dimension of the aperture.

5. A radiation source according to claim 4 wherein the thickness is more than ten times as large as the smallest dimension of the aperture.

6. A radiation source according to claim 1 wherein the aperture has a slit shape, such that the radiation exiting the slit forms a collimated fan beam.

7. A radiation source according to claim 1 wherein the radiation source is displaceable linearly with respect to the aperture, such that radiation from the radiation source does not pass through the aperture.

8. A radiation source comprising:

a plurality of individual sources of radiation;

a plate having a plurality of apertures formed therein, each said aperture facing a respective individual source of radiation; and means for moving the sources such that they do not face the apertures so that they are situated between the apertures when no radiation is desired on the side of the plate away from the source.

9. A radiation source according to claim 8 wherein the plate is a flat plate.

10. A radiation source according to claim 8 wherein the plate has a thickness that is greater than the smallest dimension of the apertures.

11. A radiation source according to claim 10 wherein the thickness is more than five times as large as the smallest dimension of the apertures, such that radiation exiting the aperture is collimated in the direction of the smallest dimension of the aperture.

12. A radiation source according to claim 11 wherein the thickness is more than ten times as large as the smallest dimension of the apertures.

13. A radiation source according to claim 8 wherein the apertures have a slit shape, such that the radiation exiting the slits forms collimated fan beams.

14. A radiation source according to claim 8 wherein the individual sources are situated along a line.

* * * * *